US008218589B1

(12) United States Patent
Saunders

(10) Patent No.: US 8,218,589 B1
(45) Date of Patent: Jul. 10, 2012

(54) HIGH-ENERGY LASER ATMOSPHERIC COMPENSATION AND AIMPOINT MAINTENANCE

(75) Inventor: Patrick Saunders, Tijeras, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1016 days.

(21) Appl. No.: 12/180,702

(22) Filed: Jul. 28, 2008

(51) Int. Cl.
*H01S 3/00* (2006.01)
(52) U.S. Cl. .......................................................... 372/33
(58) Field of Classification Search ......... 359/9; 372/33
See application file for complete search history.

(56) References Cited

U.S. PATENT DOCUMENTS 8,025,425 B2 * 9/2011 Belenkii ...................... 362/277
* cited by examiner

*Primary Examiner* — Alessandro Amari
(74) *Attorney, Agent, or Firm* — James M. Skorich; Kenneth E. Callahan

(57) ABSTRACT

A high-energy laser weapon system in which the high-energy laser beam itself is used to correct for atmospheric fluctuations thereby replacing a separate beacon illuminator system. The high-energy laser is turned off (negative pulse) periodically for a very short period giving a wavefront sensor an opportunity to measure the return of the high-energy laser beam from the target. A wavefront sensor drives a deformable mirror based on this return signal avoiding wavelength anisoplanatism. In addition, the high-energy laser weapon can be snapped ahead of the path of the target during the negative pulse to avoid tilt anisoplanitism.

3 Claims, 5 Drawing Sheets

New HEL Weapon System Atmospheric Compensation Optics Diagram

Traditional HEL Engagement Geometry

Traditional HEL Weapon System Atmospheric Compensation Optics Diagram

New HEL Engagement Geometry

New HEL Weapon System Atmospheric Compensation Optics Diagram

New HEL Engagement Geometry without a BIL
(Wavelength and Tile Anisoplanetism Compensation)

HIGH-ENERGY LASER ATMOSPHERIC COMPENSATION AND AIMPOINT MAINTENANCE

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to atmospheric compensation and aim point maintenance for high-energy laser (HEL) weapon systems operated in the atmosphere, and in particular relates to the use of the high-energy laser itself for measuring atmospheric turbulence and for maintaining the HEL aim point.

In a high-energy laser weapon system, the laser needs to be maintained on a specific area of the target for a period of time to be effective. Atmospheric compensation using adaptive optics significantly reduces the time the high-energy laser must be maintained on the target. FIG. 1 illustrates the traditional HEL engagement geometry. A tracker illuminator (TIL) is employed to measure the angle and range of the target relative to the ground based or airborne HEL weapon system. A beacon illuminator (BIL) is used to create a pseudo star on the target. The BIL return signal is measured by a wavefront sensor to determine atmospheric turbulence between the weapon system and the target. This information is then used to drive adaptive optics (deformable mirrors) to vary the HEL beam to compensate for atmospheric disturbances. This reduces the time on target required for the HEL beam to destroy the target. For size, weight, and complexity limitations, the HEL and BIL systems are usually shared aperture designs that both transmit the high-energy laser and sense the target through the same telescope since building a second separate telescope and referencing the two to each other tends to be prohibitive. The high-energy laser is often pointed open loop with no feedback as to where it is on the target. The HEL can also be pointed with respect to the BIL, but with no direct feedback if it is hitting the aim point. However, direct feedback can be obtained by looking at the HEL scatter (in band) or heated spot (black body heating or hot spot). The beacon illuminator laser operates at a different frequency than the HEL and could need to be hundreds of watts of power to get enough return signal above the background and electronic noise depending on the range to the target.

FIG. 2 is a diagram of a traditional HEL weapon system optics illustrating the BIL system and how the HEL and BIL systems are integrated. The fast steering mirror 1 removes the jitter (tilt) by using the image generated by the TIL illumination of the target on the TIL track sensor 2. This is similar to what an image stabilizer does on a camera lens to remove jitter caused by the unsteadiness of the hand-held camera. The deformable mirror 3 "cleans-up" the image distorted by the atmosphere by tilting small portions of the image so that all the photons are going in the same direction. The atmosphere will make the image or outgoing HEL distort like a bathroom window with glass that doesn't let you see clearly. The deformable mirror 3 is driven by the output of the BIL wavefront sensor 4, which measures the distortion in the wavefront caused by the atmosphere. The deformable mirror 3 applies the opposite distortion so that when the HEL arrives at the target, the photons are all going in the same direction.

The aperture sharing element 5 is a beam splitter that samples a small part of the HEL and transmits the BIL. The BIL tilt sensor 6 measures direction of the outgoing BIL to drive the BIL steering mirror 7 to point it on the target at the lead ahead point and remove any jitter in the beam. The BIL beam polarizer 8 passes the outgoing BIL polarized beam and separates the two polarizations from the return beam for the BIL wavefront sensor 4. This loss of half the BIL return power is one of the reasons the BIL is required to have significant power in the outgoing beam. The other reason is the fact that the BIL is an unresolved point on the target and is subject to the range squared loss. If the range to the target is doubled, the return power to the sensor is one fourth. This is why it is desirable to use the HEL with all its power and the scatter off the target to drive the wavefront correction.

A beacon illuminator increases the complexity, power draw, and weight of the overall weapon system. One would like to use the high-energy laser itself as the beacon illuminator since it has much more power and is already pointed at the target. However, the outgoing beam of the high-energy laser is generally continuous and the scattered light from the optics is greater than the high-energy laser return from the target.

Examples of these limitations are the Airborne Laser with its kilowatt class beacon illuminators, complex optical system, high weight and large volume. It also does not sense the return continuous wave of the high-energy laser and therefore points the high-energy laser open loop (without any feedback from target about where it is being hit). Another example is the Advanced Tactical Laser that has no beacon illuminator due to the size and weight limitations of the small aircraft platform upon which it is mounted. Consequently, it cannot compensate for atmospheric turbulence resulting in greatly increased time on target to be effective.

SUMMARY OF THE INVENTION

High-energy laser weapon systems normally need to compensate for atmospheric fluctuations using adaptive optics. The atmospheric compensation is usually done using a separate beacon illuminator laser to create a pseudo star on the target and sense the return in a wavefront sensor to drive the adaptive optics. In the present invention the high-energy laser itself is used as a beacon illuminator by turning it off periodically for a very short period giving the wavefront sensor and aim point sensor an opportunity to measure the return from the high-energy laser. In addition, the high-energy laser weapon can be snapped ahead of the path of the target to avoid anisoplanatism.

DESCRIPTION OF THE PREFERRED EMBODIMENT

The present invention uses the high-energy laser itself to measure the atmospheric disturbances and the location of the laser on the target by turning the high-energy laser off for a very brief time (negative pulse), for example 200 nanoseconds to 20 microseconds, while the wavefront sensor and aim point sensor look at the high-energy laser return. The wavefront sensor is not operated for the first approximate 100 ns of the negative pulse to give the outgoing photons and any backscatter a chance to clear the local optics and very close atmosphere just outside the output telescope. The photons travel at about one foot per nanosecond and, therefore, about 50 feet of beam train is clear of outgoing high-energy laser light in the first 100 ns (round trip of 100 ft). Since the return from the target is very strong due to the high power of the high-energy laser, there are plenty of photons to detect in the short wavefront sensor integration time of 0.100 to 1.9 microseconds or whatever is the length of negative pulse that is needed for the specific scenario, beam control layout, and detector sensitivity being used.

The return signal from the HEL is continuous with the exception of the negative pulses. The timing of the negative pulses must account for the round trip to the target to ensure that when the wavefront sensor looks for signal during a negative pulse, there is time for the signal emitted just prior to the start of the negative pulse to be reflected from the target and return to the sensor. This timing is coordinated with the tracker illuminator that will determine range to the target by counting the time between the outgoing pulse and the return pulse as is done in current systems. Since the range to the target is known from the tracker illuminator, the pulse timing is simply a matter of knowing when a negative pulse occurs and shifting the negative pulse repetition frequency so the round trip time does not fall on another negative pulse, as is done in most active track designs. This time is simply the round trip time of 2 times the range, R, divided by the speed of light, c, i.e. (2R/c). Note that a tracker illuminator is not necessarily required if range is known from some other source such as radar and the target is acquired and tracked passively.

A q-switch may be used to block scattered light and ensure the wavefront sensor is not saturated before the desired detection and is opened only for the sensor integration time that is synchronized with the HEL negative pulse. For more scatter rejection, the HEL can be polarized and the opposite polarization can be detected from the target, again as in current beacon designs.

Figure 1:
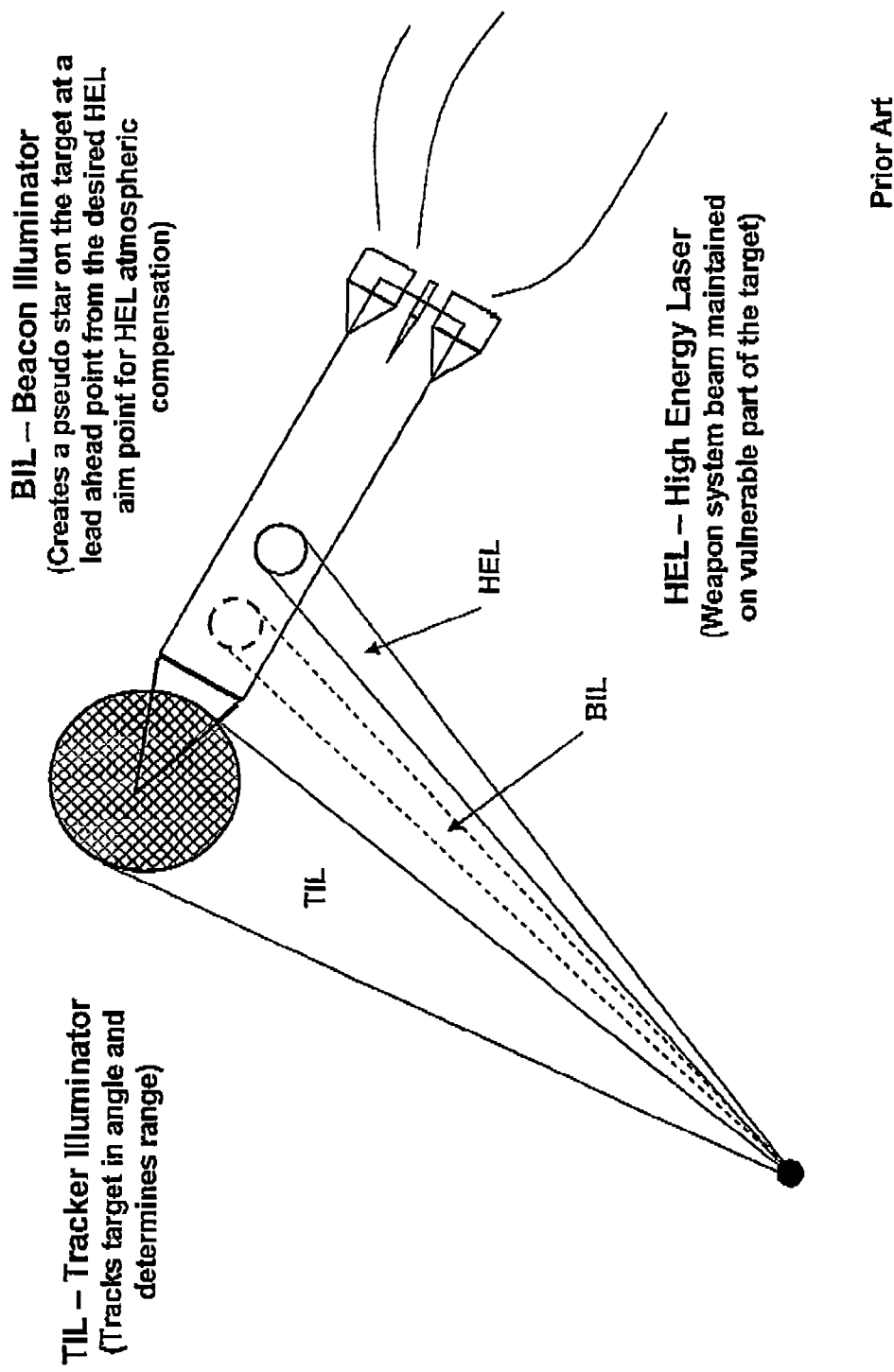
FIG. 1 illustrates the traditional high-energy laser weapon system engagement geometry.
Figure 2:
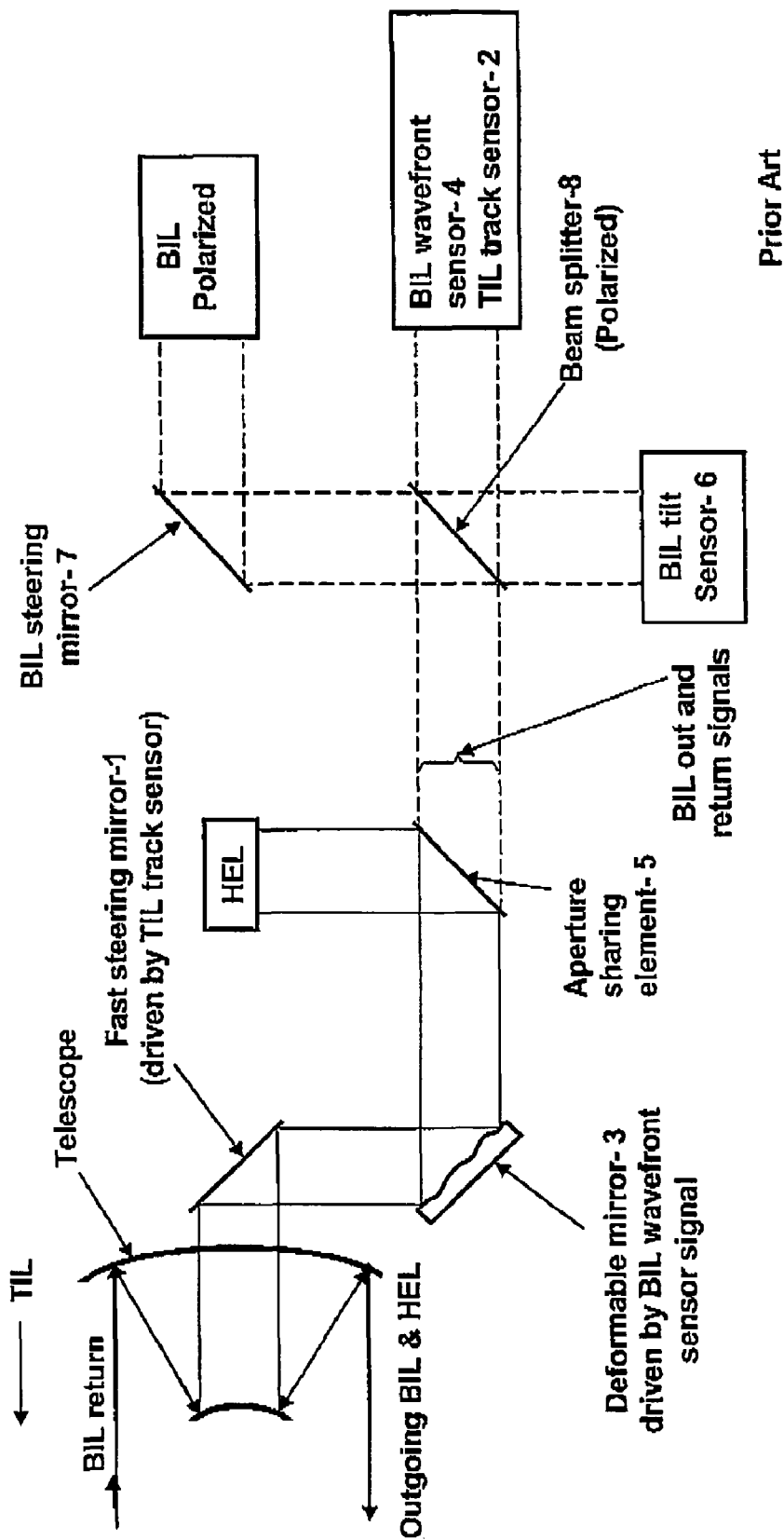
FIG. 2 is a simplified diagram of a tradition HEL system optics with a separate beacon illuminator used for atmospheric compensation.
Figure 3:
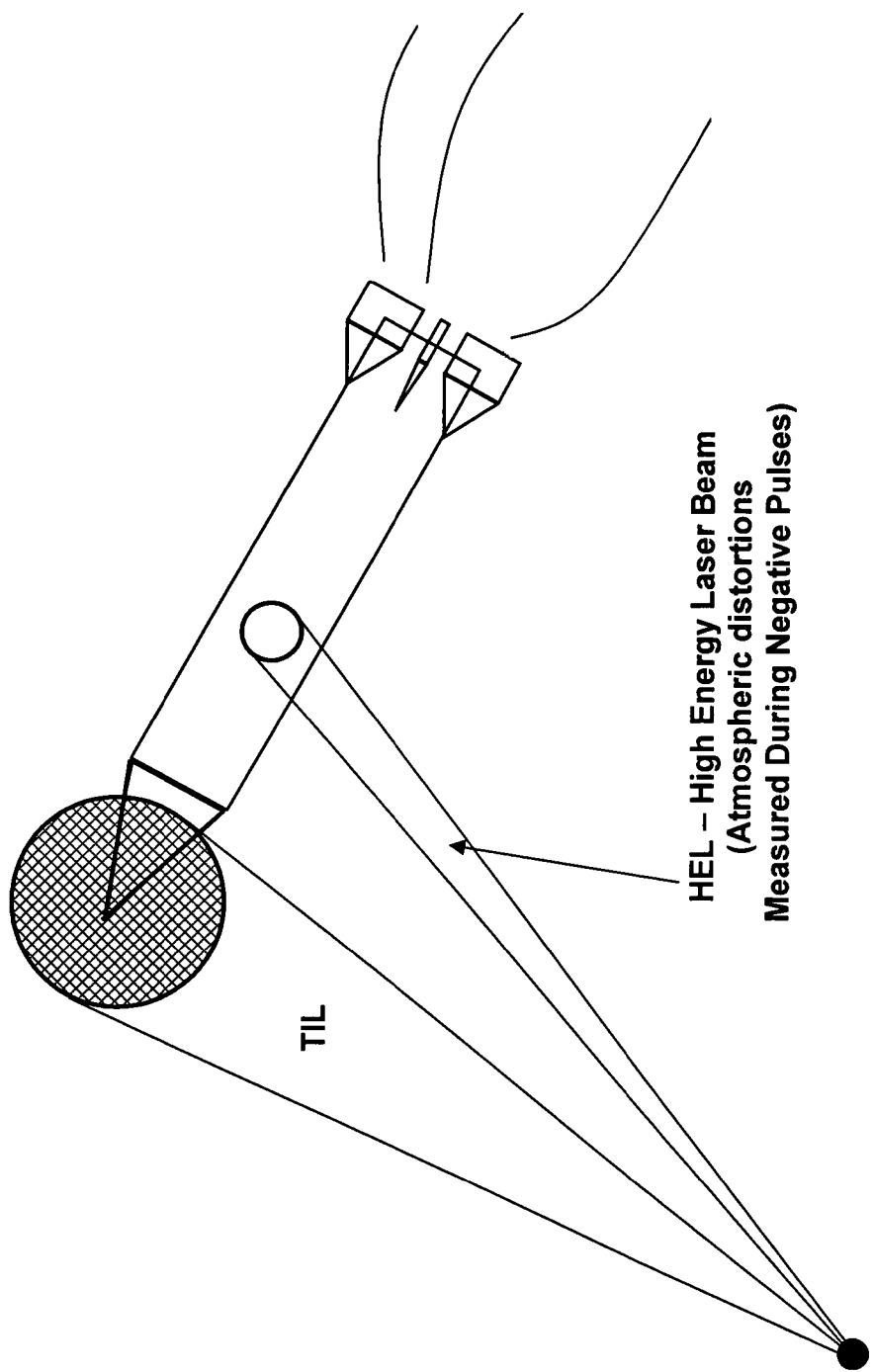
FIG. 3 illustrates the engagement geometry for the new HEL system with atmospheric compensation provided by the HEL system itself.
Figure 4:
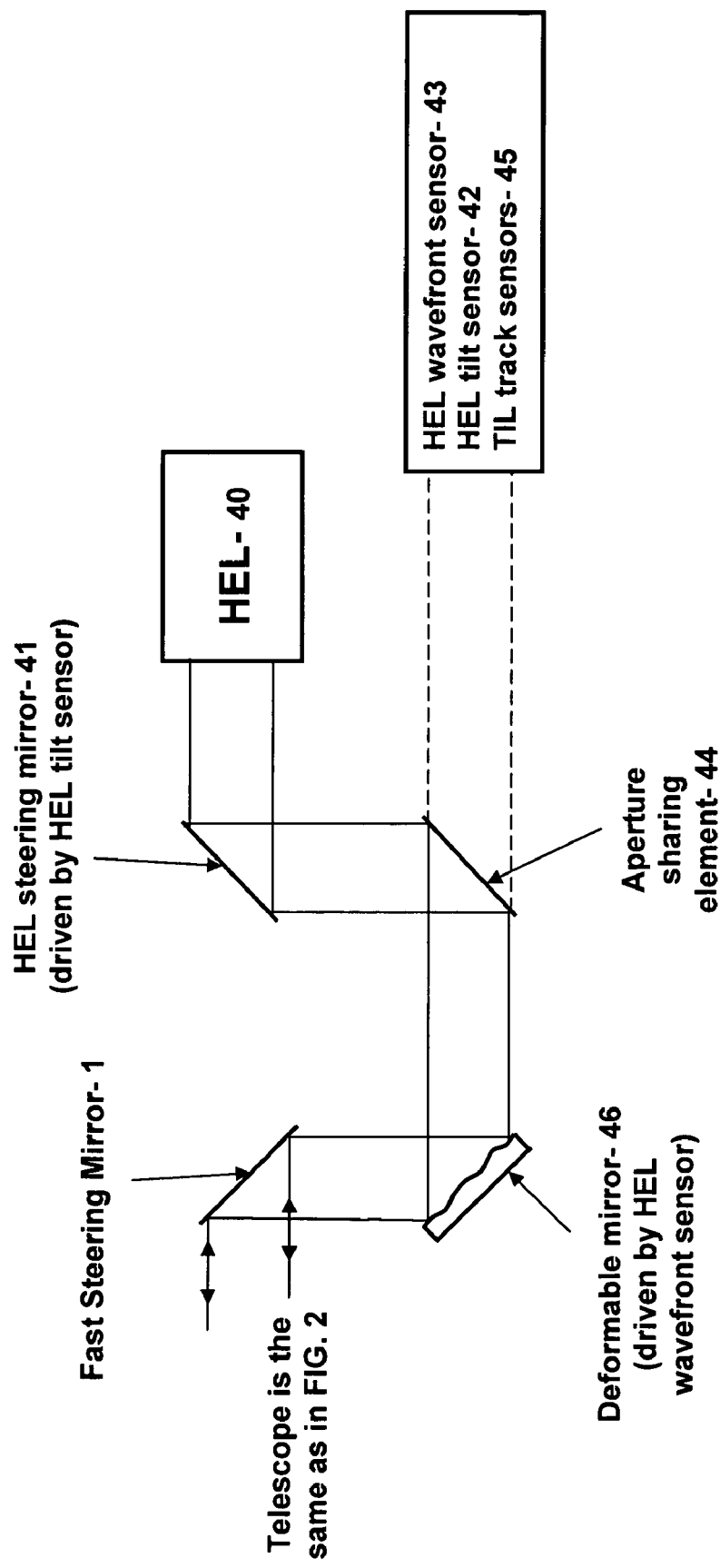
FIG. 4 is a diagram of the new HEL system optics for atmospheric compensations.

FIG. 3 shows the HEL engagement geometry in which the BIL atmospheric compensation function is replaced by the HEL during negative pulses. In this case, only wavelength anisoplanatism is compensated. Anisoplanatism is the difference between what is being measured in the atmosphere and what the projected beam actually passes through. Differences can be due to a different path or due to a difference in wavelengths, e.g., the difference between the BIL wavelength and the HEL wavelength. In a traditional laser weapon system, a BIL is operated at a frequency different from the HEL. The present invention uses the same laser (the HEL) to measure the atmospheric disturbances thereby eliminating chromatic or wavelength anisoplanatism. FIG. 4 is a simplified optics diagram for a laser weapons system in which a HEL wavefront sensor 43 is used during negative pulses to correct for atmospheric disturbances via the deformable mirror 46. The HEL 40 beam is directed toward the deformable mirror 46 by the aperture sharing element 44 (beam splitter). Some of the HEL beam reflected off of the target is collected by the telescope and passes through the aperture sharing element 44 to the HEL wavefront sensor 43 and the HEL tilt sensor 42. The HEL wavefront sensor 43 measures the atmosphere distortions to the HEL beam during negative pulses and drives the deformable mirror 46 to make corrections. The HEL tilt sensor 42 compensates for jitter in the HEL beam via the HEL steering mirror 41. The telescope and the TIL target tracking mirror (fast steering mirror 1) are the same as in FIG. 2.

Tilt anisoplanatism can occur if the target is moving tangentially relative to the HEL weapon system. This effect is due to special relativity and the time of flight of light. Traditional systems point the BIL forward of the HEL aim point (the lead ahead point) by 2v/c, where v is the tangential velocity difference between the target and HEL weapon system and c is the speed of light. This way the return path of the beacon photons sample the atmosphere in the path that the outgoing HEL photons will subsequently pass through. Since in the present invention there is no separate BIL laser, the HEL can be used to do this function. To accomplish this, the HEL needs to be "snapped" forward to the lead ahead point by a very fast steering mirror for a very short time. Current fast steering mirrors can reach accelerations on the order of 10,000 radians per second per second ($r/s^2$) for a 5 inch mirror and are capable of steering the HEL beam forward fast enough to snap ahead to the lead ahead point. The key is to sample the HEL return timed with the return of the "snapped" HEL when the negative pulse occurs. This is timed knowing the range to the target and knowing when a "snap" occurs. The frequency for the snaps required will again depend on the scenario, but should not need to be much above 1000 Hz. At 10,000 $r/s^2$, the HEL can be snapped forward 5 microradians in about 20 microseconds, held forward for 1 microsecond. These times can vary greatly depending on the HEL technology, the wavefront sensor/optics sensitivity, and steering mirror capability. Most of the snap forward time is getting there and back. The hold time is just the HEL wavefront sensor integration time and uncertainty in the range (timing of the wavefront sensor on/off times) while the signal is measured and then return to the aim point in a total of 41 microseconds in this example. If the frequency of the snaps is 1000 Hz, the total time away from the aim point is about 4% (41 µs×1000/100%)—insignificant for total kill time. The steering mirror for the snap would already be part of any system for aim point maintenance and therefore is not additional hardware.

Figure 5:
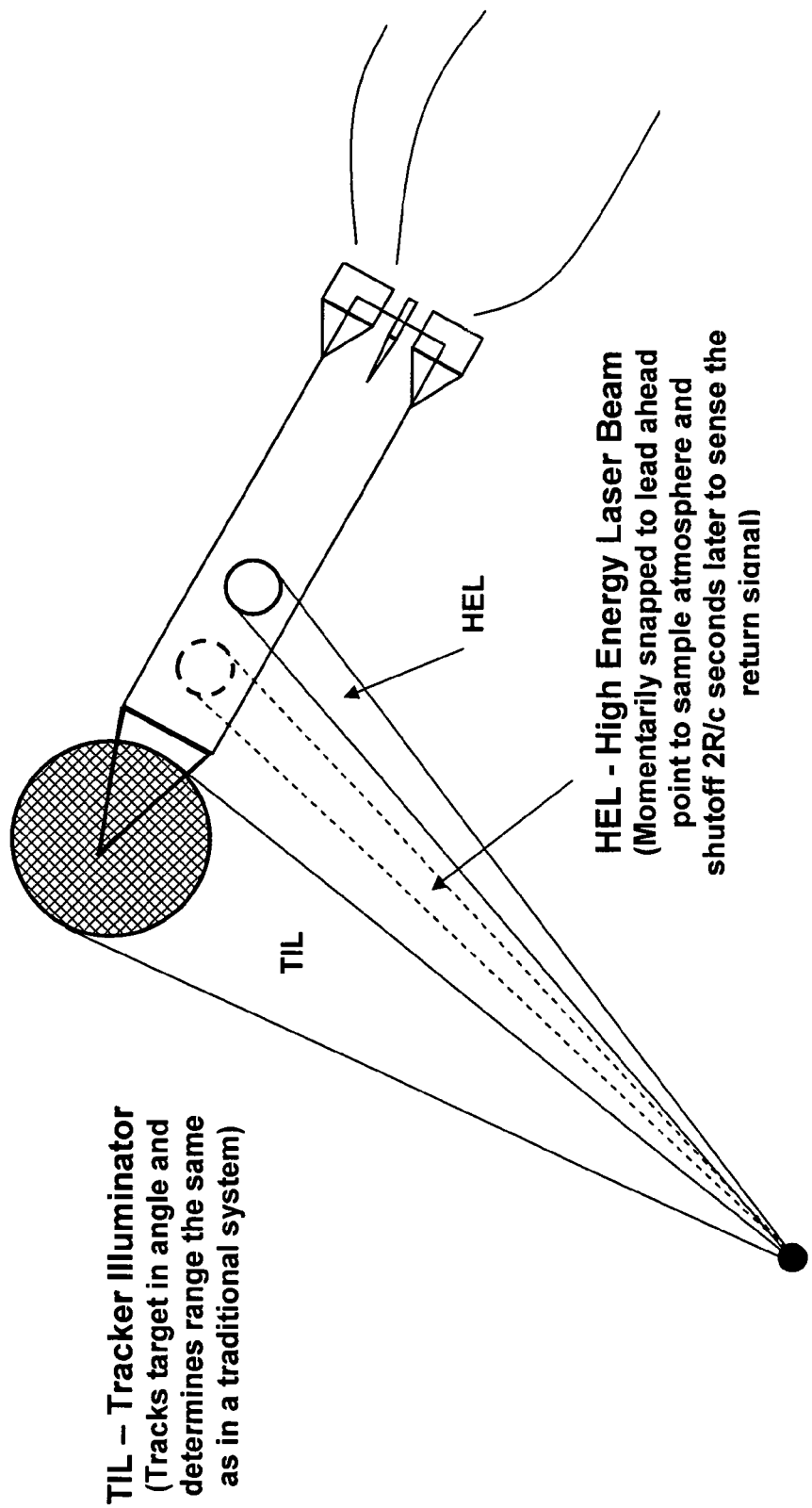
FIG. 5 illustrates the engagement geometry for the new HEL system with atmospheric compensation provided by the HEL system for both wavelength and tilt anisoplanatism.

FIG. 5 illustrates the engagement geometry in which the HEL beacon is snapped ahead and when properly synched with the negative pulse, compensates for both wavelength and tilt anisoplanatism. The fast steering mirror 1 of FIG. 2 is used for the snap ahead maneuver; otherwise, the optics diagram is similar to FIG. 4.

How the HEL is turned off and how often will be specific to the HEL design and engagement scenario. Aim point updates can be very effective at sample rates as low as 100 hertz, but most scenarios will require kilohertz sample rates and thus kilohertz negative pulses and snaps to reduce jitter on target. As for turning off the HEL, this is very specific to the HEL. For solid-state lasers using a master oscillator/power amplifier (MOPA) configuration, the master oscillator can be negatively pulsed for hundreds of nanoseconds in most lasers without turning off the pump diodes for the power amplifier. In power oscillator designs or for much longer negative pulses (for longer sensor integration times), the pump diodes are turned off and then back on. This is commonly done using a pulse forming network and pulsed power supplies or batteries.

The invention claimed is:
1. A high-energy laser weapon system comprised of:
a. tracker means for determining angle and range of a target with respect to said weapon system;
b. means for producing a high-energy laser beam;
c. means for directing said high-energy laser beam onto said target at a desired aim point;
d. means for periodically producing a negative pulse of 0.2 to 200 microseconds duration, said negative pulse being the time said high-energy laser beam is turned off;
e. a wavefront sensor to measure the high-energy laser beam return from said target during said negative pulse;
f. a switching means for blocking the high-energy laser beam return reflected off of said target to said wavefront sensor except during said negative pulse plus approximately 0.1 microsecond; and
g. a deformable mirror driven by said wavefront sensor, whereby wavelength anisoplanatism of said high-energy laser beam is avoided.

2. The high-energy laser weapon system of claim 1, wherein said means for directing said high-energy laser beam onto said target is a fast steering mirror.

3. The high-energy laser weapon system of claim 2, wherein said fast steering mirror is used to periodically direct said high-energy laser beam ahead of said aim point during said negative pulse such that tilt anisoplanatism of said high-energy laser beam is corrected.

* * * * *